United States Patent [19]

Dembowski et al.

[11] 4,138,537
[45] Feb. 6, 1979

[54] PEROXIDE VULCANIZED W-TYPE CHLOROPRENE

[75] Inventors: Ronald J. Dembowski, Muncie; David O. Werbil, Indianapolis, both of Ind.

[73] Assignee: Ball Corporation, Muncie, Ind.

[21] Appl. No.: 773,226

[22] Filed: Mar. 1, 1977

[51] Int. Cl.$^2$ ............................ C08F 8/00; C08F 8/06; C08F 8/42
[52] U.S. Cl. ............................ 526/47.8; 260/23.7 H; 260/42.34; 526/57
[58] Field of Search ................... 526/57, 47.8; 260/23, 260/7 H, 42.34

[56] References Cited

U.S. PATENT DOCUMENTS

| 3,129,204 | 4/1964 | Gilmont | 526/57 |
| 3,344,125 | 9/1967 | Gerritsen | 260/878 |

FOREIGN PATENT DOCUMENTS 945187 7/1956 Fed. Rep. of Germany ............ 526/57

*Primary Examiner*—William F. Hamrock
*Attorney, Agent, or Firm*—Gilbert E. Alberding

[57] ABSTRACT

An antioxidant-free vulcanizable composition comprises W-type polychloroprene and a β-substituted diperoxyketal selected from 2,2-bis-(t-butyl peroxy) butane and 1,1-bis-(t-butyl peroxy)-3,3,5-trimethyl cyclohexane.

14 Claims, No Drawings

PEROXIDE VULCANIZED W-TYPE CHLOROPRENE

BACKGROUND OF THE INVENTION

This invention relates to vulcanizable polychloroprene compositions. More particularly, it relates to vulcanizable general purpose W-type polychloroprene compositions having incorporated therein a β-substituted diperoxyketal selected from the group consisting of 2,2-bis-(t-butyl peroxy) butane and 1,1-bis-(t-butyl peroxy)-3,3,5-trimethyl cyclohexane in the absence of an antioxidant.

Chloroprene elastomers are well known materials in the rubber art and useful elastomeric products must necessarily be vulcanized, i.e. "cured" by crosslinking. Heretofore, it has been considered necessary in order to achieve good aging vulcanizates to employ an antioxidant in conventional formulations of all types of chloroprene. It has now been found that vulcanizates of W-type chloroprene exhibiting highly desirable aging characteristics can be achieved without the need of employing an antioxidant in the curing thereof when the vulcanizable composition has incorporated therein a β-substituted diperoxyketal selected from the group consisting of 2,2-bis(t-butyl peroxy) butane and 1,1-bis-(t-butyl peroxy)-3,3,5-trimethyl cyclohexane.

Diperoxyketals have been employed in the past for the curing of such materials as ethylene, diallyl phthalate/polyethylene glycol fumarate, and vinyl monomers. Illustrative patents disclosing the use of diperoxyketals in such curing systems include U.S. Pat. No. 2,650,913 which discloses the use of 2,2-bis-(t-butyl peroxy) butane for ethylene polymerization; U.S. Pat. Nos. 2,656,334 and 2,692,260 which disclose vinyl polymerization utilizing a combination such as dibenzoyl peroxide and 2,2-bis(t-butyl peroxy) butane; Netherlands application No. 6,403,775 (Jan. 25, 1965) which discloses high pressure ethylene polymerization using various bis-(t-butyl peroxy) ketals; U.S. Pat. No. 2,698,311 which discloses the curing of unsaturated polyester resins such as diallyl phthalate/polyethylene glycol fumarate using 2,2-bis(t-butyl peroxy) butane; German Pat. No. 945,187 which discloses the use of 2,2-bis(t-butyl peroxy) butane and 1,1-bis-(t-butyl peroxy)-3,3,5-trimethylcyclohexane as catalysts for a rubber vulcanizing process; U.S. Pat. No. 3,296,184 which discloses the vulcanization of olefin polymers and ethylene α-olefin copolymers with a peroxidic compound having a di-perketalic structure; U.S. Pat. No. 3,344,125 which discloses crosslinking a saturated synthetic rubber with a peroxide including 1,1-bis-(t-butyl peroxy)-3,3,5-trimethylcyclohexane; and U.S. Pat. No. 3,686,102 which discloses curing ethylenically unsaturated monomers with certain β-substituted diperoxyketals such as 2,2-di(t-butyl peroxy)-4-methyl pentane.

BRIEF SUMMARY OF THE INVENTION

This invention relates to a vulcanizable W-type chloroprene composition and to a process for vulcanizing or curing the said W-type chloroprene composition having incorporated therein a β-substituted diperoxyketal selected from the group consisting of 2,2-bis-(t-butyl peroxy) butane and 1,1-bis-(t-butyl peroxy)-3,3,5-trimethyl-cyclohexane, in the absence of an antioxidant.

DETAILED DESCRIPTION OF THE INVENTION

It has now been discovered that W-type chloroprene vulcanizates exhibiting highly desirable heat aging characteristics can be provided by curing W-type chloroprene polymers in the absence of an antioxidant and in the presence of a β-substituted diperoxyketal selected from the group consisting of 2,2-bis(t-butyl peroxy) butane and 1,1-bis-(t-butyl peroxy)-3,3,5-trimethyl cyclohexane. This process has been found to provide lower product cost; lower product specific gravity; a fast cure rate at lower temperatures thereby securing energy conservation and reduction of back-rinding in injection molding; and reduced dispersion problems in the mixed product. Thus, the cured W-type chloroprene resulting from the process of this invention exhibits not only excellent long term heat aging characteristics but also favorable tensile and elongation properties, desirable hardness and low compression set characteristics and favorable tear strength properties.

The vulcanizable W-type chloroprene composition of the present invention comprises per 100 parts by weight of W-type chloroprene, 0–300 parts by weight and preferably 0–150 parts by weight filler, 0–10 parts by weight and preferably 0 to 5 parts by weight processing aid, 0–200 parts by weight and preferably 0–100 parts by weight plasticizing agent, 0 to 10 parts by weight and preferably 0 to 5 parts by weight metallic oxide curing aid and 0.1–10 parts by weight and preferably 1–5 parts by weight β-substituted diperoxyketal selected from the group consisting of 2,2-bis-(t-butyl peroxy) butane and 1,1-bis-(t-butyl peroxy)-3,3,5-trimethyl cyclohexane.

Known W-type chloroprenes can be employed in the present invention and include Neoprene W, W-M1, WHV, WHV-100, WHM, WX, WRT, WD and WB. Neoprene W is free from staining stabilizer, elemental sulfur, thiuram disulfide, or other compound capable of decomposing to yield either free sulfur or a vulcanization accelerator; Neoprene W-M1 is a form of W with a lower viscosity; Neoprene WHV is a very high viscosity form of W; Neoprene WHV-100 is a form having a viscosity range intermediate that of W and WHV; Neoprene WHM has a molecular weight and viscosity higher than those of WHV; Neoprene WRT has the same viscosity as Neoprene W but somewhat more nerve and slightly lower tensile and tear strengths; Neoprene WD is essentially equivalent to WRT; Neoprene WX has a crystallization resistance intermediate W and WRT; and Neoprene WB has the same viscosity range as W and a crystallization resistance equivalent to that of WX.

Various conventional additives can also be employed. Thus, the vulcanizable compositions can include such materials as carbon black, particularly HAF (high abrasion furnace) carbon black, fine silica, clays, calcium carbonate, hydrated calcium silicate, titanium dioxide, hydrated aluminum and fine particle sized whitings. The filler can be present in an amount between 0–300 parts by weight, preferably 0–150 parts by weight, per 100 parts of W-type chloroprene.

Processing aids such as stearic acid can be employed in an amount between 0–10 parts by weight, preferably 0–5 parts by weight, per 100 parts of W-type chloroprene.

Plasticizers incorporated into the vulcanizable W-type chloroprene compositions of this invention can include conventional mineral oils and light process oils.

Petroleum-based plasticizers are quite effective and especially naphthenic oils such as that sold commercially as Circolite Oil. The plasticizer can be present in an amount between 0–200 parts by weight, preferably 0–100 parts by weight per 100 parts of W-type chloroprene.

As a vulcanization or curing aid, a metallic oxide, especially magnesia and preferably calcined magnesia is employed in an amount between 0–10 parts by weight, preferably 0–5 parts by weight, per 100 parts of W-type chloroprene.

The components of the vulcanizable W-type chloroprene compositions of this invention can be mixed at a low temperature with as short a cycle as possible to minimize the danger of scorch using standard methods employed in the rubber industry, i.e. mill mix, Banbury mixer and the like.

While the present W-type chloroprene composition is ideally employed in injection molding, other conventional methods in the rubber industry can be employed such as transfer molding, compression molding, extrusion, steam vulcanization, hot air vulcanization, salt bath curing, UHF curing and glass bead curing.

The curing or vulcanization temperature can vary over a broad range, for instance, from 280° to 400° F., although the temperature is generally in the range of 300 to 375° F. The time can also vary considerably from a few minutes to several hours, although usually a vulcanizing or curing time of 1 to 10 minutes is employed.

The following non-limiting examples illustrate the present invention. Unless otherwise stated, all parts and percentages are by weight.

EXAMPLES 1–5

Neoprene WRT in each example was admixed with the components shown in Table I on a two roll mill to effect uniform dispersion. The resulting mixture was vulcanized at a temperature of 325° F. for 5 minutes in an injection mold. The resulting cured W-type polychloroprene was tested for hardness, tensile strength, elongation, tear strength and compression set. The vulcanizable compositions, conditions and test results are shown in Table I.

Table I

|  | Example 1 | Example 2 | Example 3 | Example 4 | Example 5 |
| --- | --- | --- | --- | --- | --- |
| Neoprene WRT (pbw) | 100.0 | 100.0 | 100.0 | 100.0 | 100.0 |
| Stearic acid | 0.5 | 0.5 | 0.5 | — | — |
| MgO | 2.0 | 2.0 | 2.0 | — | 2.0 |
| HAF Carbon Black | 40.0 | 40.0 | 40.0 | 40.0 | 40.0 |
| Dixie Clay | 25.0 | 25.0 | 25.0 | 25.0 | 25.0 |
| Naphthenic oil (Circolite Oil) | 25.0 | 25.0 | 25.0 | 25.0 | 25.0 |
| 1,1-bis-(t-butyl peroxy)-3,3,5-trimethyl-cyclohexane (sold under the trade name "Luperco D-231-XL" | 3.0 | 3.0 | 3.0 | 3.0 | 3.0 |
| Antioxidant-trimethyl-dihydroquinoline, sold under the trade mark "Age Rite Resin D" | — | 1.0 | — | — | — |
| Naugard 445 | — | — | 1.0 | — | — |
| Cure (time min/temp,° F) | 5/325 | 5/325 | 5/325 | 5/325 | 5/325 |
| Shore A hardness | 57 | 53 | 50 | 59 | 61 |
| Tensile strength (psi) | 2100 | 2060 | 1770 | 2157 | 2290 |
| Elongation % | 380 | 520 | 570 | 430 | 380 |
| Tear Strength (lb/in) | 166 | 179 | 186 | 185 | 181 |
| Compression Set %, 22 hr/158° F | 12.6 | 23.4 | 14.6 | 10.0 | 9.0 |

Each of the above vulcanizates were then heat aged at 158° F. for 96 hours, the vulcanizable compositions of Examples 1, 4 and 5 contained no antioxidant, while those of Examples 2 and 3, for comparison purposes contained a conventional antioxidant. The heat aged vulcanizates were then tested for hardness, tensile strength and elongation. The results are shown in Table II. Equally favorable results and essentially similar comparisons are achieved when the 1,1-bis-(t-butyl peroxy)-3,3,5-trimethyl cyclohexane is replaced in the above examples with an essentially equivalent amount of 2,2-bis-(t-butyl peroxy)butane.

Table II

|  | Example 1 | Example 2 | Example 3 | Example 4 | Example 5 |
| --- | --- | --- | --- | --- | --- |
| Shore A hardness | 64 | 65 | 58 | 60 | 68 |
| Tensile strength (psi) | 2240 | 2240 | 1925 | 2030 | 2336 |
| Elongation % | 383 | 472 | 567 | 393 | 372 |

EXAMPLE 6

To illustrate that the present invention provides advantages not secured when the chloroprene employed is other than one of the W-type series, the following components were again admixed on a two roll mill and then vulcanized in the manner employed in Examples 1–5 at a temperature of 325° F., it being noted that it took 9 minutes to cure the composition rather than the 5 minutes experienced with W-type chloroprene. The resulting vulcanizate was tested for hardness, tensile strength and elongation. The results are shown in Table III.

Table III

| Neoprene GN (pbw) | 100.0 |
| --- | --- |
| Stearic Acid | 0.5 |
| MgO | 2.0 |
| HAF Carbon Black | 40.0 |
| Dixie Clay | 25.0 |
| Naphthenic oil (Circolite Oil) | 25.0 |
| Luperco D-231-XL | 3.0 |
| Cure (time, min/temp,° F) | 9/325 |
| Shore A hardness | 60 |
| Tensile Strength (psi) | 1765 |
| Elongation % | 450 |

Having now fully described the invention, it will be apparent to one of ordinary skill in the art that changes and modifications can be made thereto without departing from the spirt or scope of the invention.

What is claimed is:

1. An antioxidant-free vulcanizable composition comprising W-type polychloroprene and a vulcanizing amount of a vulcanizing agent consisting essentially of a β-substituted diperoxyketal selected from the group consisting of 2,2-bis-(t-butyl peroxy) butane and 1,1-bis-(t-butyl peroxy)-3,3,5-trimethyl cyclohexane.

2. The composition of claim 1 which also includes a filler.

3. The composition of claim 2 wherein the filler is selected from carbon black, clay and mixtures thereof.

4. The composition of claim 1 which also includes a metallic oxide.

5. The composition of claim 4 wherein the metallic oxide is magnesia.

6. The composition of claim 1 which also includes a plasticizer.

7. The composition of claim 6 wherein the plasticizer is a naphthenic oil.

8. The composition of claim 1 which also includes stearic acid as a processing acid.

9. The composition of claim 1 wherein the β-substituted diperoxyketal is 1,1-bis-(t-butyl peroxy)-3,3,5-trimethyl cyclohexane.

10. The composition of claim 1 wherein the β-substituted diperoxyketal is 2,2-bis-(t-butyl peroxy) butane.

11. An antioxidant-free vulcanizable composition comprising per 100 parts by weight W-type chloroprene, 0–300 parts by weight filler, 0–10 parts by weight processing aid, 0–200 parts by weight plasticizer, 0 to 10 parts by weight metallic oxide curing aid and 0.1–10 parts by weight of a β-substituted diperoxyketal selected from the group consisting of 2,2-bis-(t-butyl peroxy) butane and 1,1-bis-(t-butyl peroxy)-3,3,5-trimethyl cyclohexane.

12. A vulcanized article obtained from the vulcanizable composition of claim 1.

13. In a process for vulcanizing a W-type polychloroprene containing composition, the improvement comprising vulcanizing said composition in the absence of an antioxidant and in the presence of a vulcanizing amount of a vulcanizing agent consisting essentially of a β-substituted diperoxyketal selected from the group consisting of 2,2-(t-butyl peroxy) butane and 1,1-bis-(t-butyl peroxy)-3,3,5-trimethyl cyclohexane.

14. A process for vulcanizing an elastomer which comprises heating an antioxidant-free vulcanizable composition comprising W-type polychloroprene and a vulcanizing amount of a vulcanizing agent consisting essentially of a β-substituted diperoxyketal selected from the group consisting of 2,2-bis-(t-butyl peroxy) butane and 1,1-bis-(t-butyl peroxy)-3,3,5-trimethyl cyclohexane at a temperature in the range of 280° to 400° F. for a period of time sufficient to effect vulcanization.

* * * * *